United States Patent [19]

Schie et al.

[11] Patent Number: 5,847,550
[45] Date of Patent: Dec. 8, 1998

[54] EXIT SIGN HAVING A PULSE SWITCHING TANDEM FLYBACK VOLTAGE CONVERTER AND A BACKUP BATTERY

[75] Inventors: David Schie, Glendale Heights; James A. Rekowski, Prospect Heights, both of Ill.

[73] Assignee: Juno Lighting, Inc., Des Plaines, Ill.

[21] Appl. No.: 862,177

[22] Filed: May 22, 1997

Related U.S. Application Data

[62] Division of Ser. No. 731,938, Oct. 18, 1996, Pat. No. 5,656,925.

[60] Provisional application No. 60/010,281 Jan. 22, 1996.

[51] Int. Cl.⁶ .................................................. G05F 1/613
[52] U.S. Cl. ............................ 323/222; 323/282; 363/16
[58] Field of Search ................................... 323/222, 282, 323/351; 363/15, 16

[56] References Cited

U.S. PATENT DOCUMENTS

| | | | |
|---|---|---|---|
| 4,530,043 | 7/1985 | Palm et al. | 323/222 |
| 5,418,709 | 5/1995 | Lukemire | 323/282 |
| 5,457,379 | 10/1995 | Jacobs et al. | 323/222 |
| 5,461,302 | 10/1995 | Garcia et al. | 323/351 |
| 5,530,638 | 6/1996 | Wu | 363/16 |
| 5,583,421 | 12/1996 | Barbehenn et al. | 323/222 |
| 5,656,925 | 8/1997 | Schie et al. | 363/16 |

OTHER PUBLICATIONS

Application Notes published by Unitrode on pulse switching integrated circuits, Type UCC3889 and related types, comprising 22 pages of copies, Sep. 1996.

*Primary Examiner*—Jeffrey Sterrett
*Attorney, Agent, or Firm*—Palmatier & Zummer; Francois N. Palmatier; Anthony S. Zummer

[57] ABSTRACT

This invention allows conversion from AC or DC line voltage between 70 and 424 volts to small loads between 2.5V and 18V DC for charging of batteries and operating of small loads. The invention uses a topology including two flyback stages in tandem. This invention has many uses and we are believed to be the first to apply it to battery charging and the operation of small loads. The invention is very cost effective and has feedback both from the input line voltage and output voltage to allow different loads and to allow the universal voltage input. The invention operates at high frequency and thus eliminates large transformers and uses surface mount components. All of this results in its very small size, low heat generation, and high efficiency. The invention draws very little power when connected only to a battery without the AC having been cycled. Primary applications for this invention include low powered uninterrupted power supply (UPS) devices. As disclosed herein, our first application is an emergency lighting device combined with an exit sign. However, we may use the same power supply for lighting equipment, lighting sensors, smoke detectors, burglar alarms, passive receivers, infrared detectors, ultrasonic detectors, stand-alone battery chargers, communications equipment or any other device which has a small load or requires charging with a battery from high input line voltages, such as 120V and higher.

26 Claims, 3 Drawing Sheets

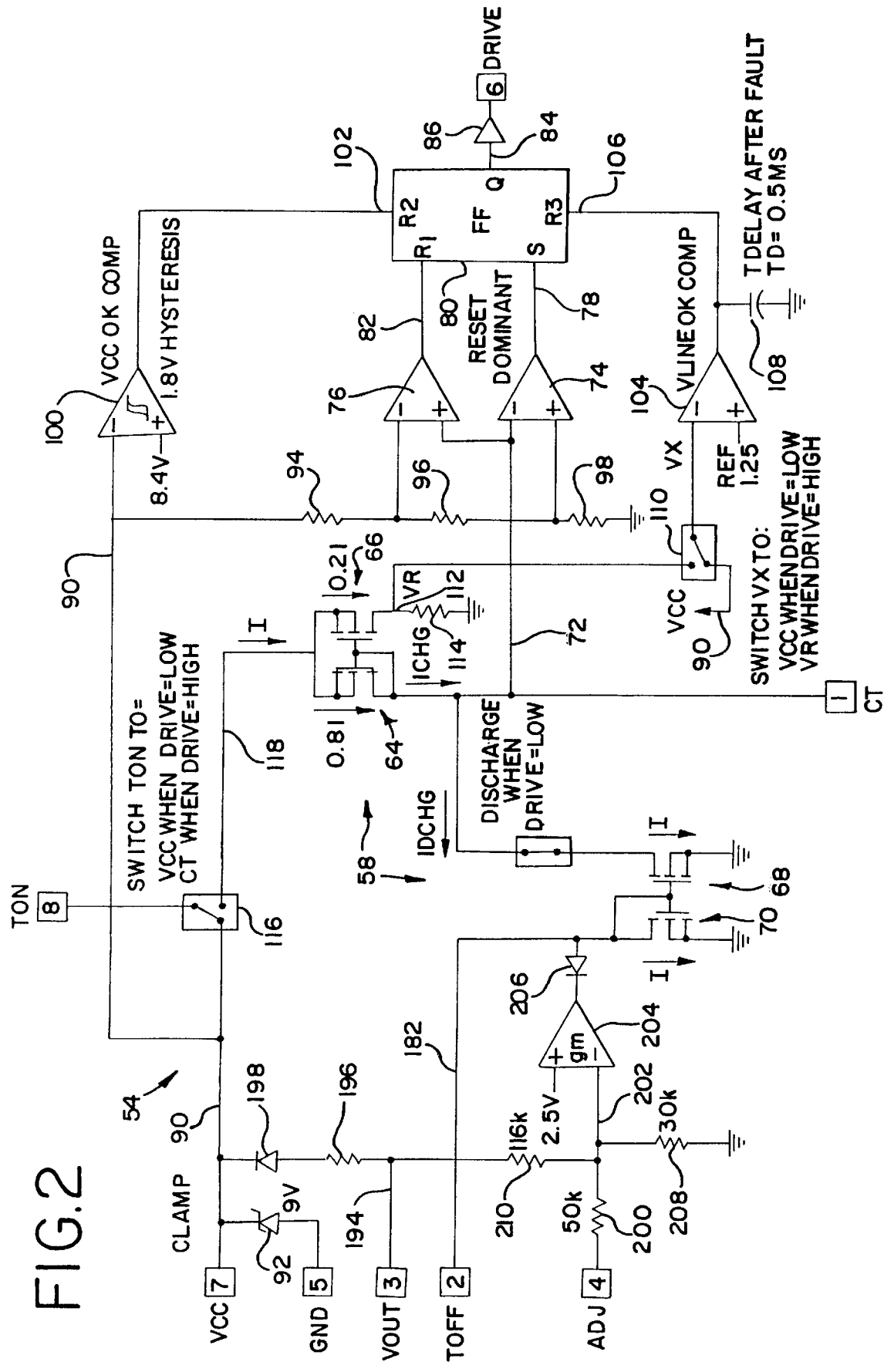

EXIT SIGN HAVING A PULSE SWITCHING TANDEM FLYBACK VOLTAGE CONVERTER AND A BACKUP BATTERY

This application is entitled to the priority of the applicant's U.S. patent application Ser. No. 731,938, filed Oct. 18, 1996, now U.S. Pat. No. 5,656,925, dated Aug. 12, 1997, of which this application is a division; and this application is also entitled to the priority of the applicant's Provisional Patent Application No. 60/010,281, filed Jan. 22, 1996.

FIELD OF THE INVENTION

This invention relates to pulse switching power supplies for converting a high voltage alternating current (AC) or direct current (DC) input, ranging in voltage from 70 volts to 424 volts, for example, to a direct current (DC) output having a voltage ranging between 2.5 volts and 18 volts, for example, primarily for operating small loads and charging batteries. As specifically disclosed herein, the invention is applied to emergency lighting and exit signs in which the small load comprises incandescent lamps for emergency lighting and light emitting diodes (LEDs) or other appropriate lamps for illuminating the sign. The exit sign has a backup storage battery which is employed to operate the lamps when there is a power failure of the input voltage. When the input is restored, the power supply recharges the battery. However, the invention is not limited to exit signs but has many other possible applications.

BACKGROUND OF THE INVENTION

Heretofore, power supplies for converting a high voltage AC input into a low voltage DC output have employed step-down transformers for converting the high voltage AC input into a suitable low voltage AC output at the power line frequency, generally 50 or 60 hertz. The low voltage AC output would then be converted into a low voltage DC output by rectifier diodes, filter capacitors and other filter components. Such transformers are heavy and bulky. Moreover, such transformers generate considerable heat which constitutes wasted energy. To accommodate a wide range of AC input voltages, the transformers have often been provided with primary windings having several taps connected to special input terminals which must be used to accommodate different voltages. The utilization of such transformers is particularly inefficient when the power supply is employed to operate small loads, such as the LEDs of an exit sign, and for recharging small storage batteries which may be used to provide backup DC power.

SUMMARY OF THE INVENTION

The invention will be described as embodied in a new exit sign but is not limited thereto. Emergency lights and exit signs generally use 60 Hz transformers to convert from high line voltage, such as 120V, 277V or 347V to low voltage for charging batteries and operating light emitting diodes (LEDs) or compact fluorescent lamps. Hereinafter we will refer only to the LEDs but the same claims can be made about compact fluorescent sources. As the voltage transformations are so large, and the energy required by the light emitting diodes so small, generally most of the energy for conversion is wasted as heat in the transformer. Transformers furthermore require two taps or separate wires to operate at either 120V or 277V. Generally 220V and 347V signs must be purchased separately.

Apparatus described herein overcomes the inherent inefficiencies of transformers by using two high frequency flyback converters in tandem. A control technique is patent pending by Lambda Technologies and licensed to Unitrode Integrated circuits who thereafter licenses the product to any circuit in which their integrated circuit, such as type UCC3889, is used. This control technique can inexpensively implement several different flyback converters including standard flyback, feedforward, etc. and will also effectively implement the tandem flyback converter. Lambda's patent does not therefore extend to the tandem technology but only the control logic. It is possible to implement the tandem converter using other logic which they do not have a patent on. We are the first to use the tandem flyback technique for an uninterrupted power supply (UPS) and small load applications.

CONTROL LOGIC FOR BOTH OF THE POWER AND UPS SECTIONS

The device regulates the output voltage by varying the duty cycle of operation based on the line voltage and output load. The device offers precise regulation by varying the switch ON time of the duty cycle inversely with input voltage and varying the switch OFF time with output voltage. This feedback also means that both the input voltage and output load can be changed without affecting the set points of the regulator. The device operates at high frequency and therefore can use very small components dramatically reducing the size and space that an old style voltage converter would require.

Due to the simplicity of the control apparatus, the device is the most cost effective alternative on the market today despite the operating advantages. The device is used to operate LEDs as well as to charge batteries. To prolong their life, batteries require that their charge voltage be varied with temperature. The feedback control integrated circuit (IC) allows the output to be set with a resistor divider. By replacing one of the resistors thereof with a thermistor, it is possible to vary the output voltage with temperature as required by the battery.

Lead-acid storage batteries also must not be overdischarged. Battery manufacturers suggest that 6 volt lead-acid batteries not be discharged below 5.0V. The LEDs also must not turn on when the battery is installed at the factory to avoid possible discharging of the battery before the customer receives the product. This means that we must wait until AC power is applied before allowing the connection of the battery to the LEDs or other load. We are able to perform both functions simultaneously through the use of hysteresis with a standard multiple comparator integrated circuit.

Lead-acid batteries do not hold charge above 6.6V on their own. However, they must be charged by a voltage between 6.8V and 7.1V depending upon temperature. By having the LEDs engage at 6.7V and then using hysteresis to cause the load switching device to turn off again at 5.0V we use a single device to solve both of the problems mentioned above. Before turning on the LEDs through the battery, however, we also check that the AC voltage has indeed failed. Otherwise the battery and AC power might simultaneously try to turn on the LEDs.

The LEDs are a very low power load. We also wish to run small lamps which are higher power loads. There are a variety of semiconductor switch choices available including bipolar transistors (BJTs) insulated gate bipolar transistors (IGBTs) and gate turnoffs (GTOs) for this application. However, metal oxide silicon field effect transistors, (MOSFETs) are preferable. All of the different loads mentioned would normally require different power regulators due to the fact that they require different currents. Due to the feedback inherent in this topology it can operate all these loads and charge batteries of different capacities.

UNIVERSAL VOLTAGE INPUT, HIGH EFFICIENCY, LOW-COST, OUTPUT REGULATED CONVERTER

The invention is suited to any application in which a battery is charged or a small load is operated. The purpose of the invention is to provide a converter device to reduce cost, increase the efficiency and reduce the size of the device, compared with the standard transformer-based power regulator used in such devices. The converter device is small as it operates at high frequency. The device is efficient as it uses two flyback converters in tandem. The device is low in cost as it requires very little space, very few parts, and the parts are smaller than those for 060 Hz design, due to the fact that less energy needs to be stored in each cycle when we use thousands of cycles per second.

We wish to claim the application of the tandem flyback technique for use in any application involving UPS or relatively low power loads. We also wish to claim the inexpensive test switch topology, the low cost battery cutoff and cycling logic, and the unique and low cost temperature compensation technique we have implemented. We have so far applied the above to an exit sign with an optional battery backup and emergency lighting comprising an incandescent lamp, but do not wish to limit the patent to this scope. We acknowledge that we are using a control patent pending by Lambda Technologies and licensed to us through their agreement with Unitrode Integrated Circuits due to the use of their controller. We also note that they have not patented the tandem flyback technique for UPS and low power loads or any of the other techniques or solutions that we claim.

We will now summarize the operational and technical features of the invention. The invention works by drawing power from the AC line through a bridge rectifier and into two bulk storage capacitors. DC input voltage of either polarity will simply pass through the rectifier into the two bulk storage capacitors. These capacitors will be referred to herein as the DC input. The DC input is placed across a first inductor having a small inductance value. This inductor stores energy as current rises linearly therein when voltage is put across it. Voltage is put across the inductor when an electronic switch, in this case a MOSFET, shorts one end of the inductor to ground while the other end is connected to the DC input which is itself connected on the negative end to ground. At the same time a storage capacitor having previously been filled with energy during the preceding cycle is shorted by the same switch across a second inductor which charges to negative voltage. This capacitor acts as a second smaller DC input to the second inductor. At the end of this cycle we have transferred our energy from the DC input to the first inductor and from the storage capacitor to the second inductor.

When the electronic switch is turned OFF, the first inductor "flies back" changing its polarity and is connected across only the storage capacitor and not the DC input. The capacitor is therefore charged to a negative voltage and is cut off from the second inductor which was previously charging. This is how the storage capacitor fills up to transfer its energy to the second inductor when the electronic switch closes again. Simultaneously the voltage on the second inductor "flies back" causing its polarity to right itself and it then charges a second storage capacitor and also provides energy to the load. The second storage capacitor retains energy which it supplies to the load during that portion of the duty cycle during which the second inductor is charging and not providing energy to the load on its own. This allows us to provide continuous power to the load. As the electronic switch operates at very high frequency, the transfer of energy, from first inductor to first capacitor to second inductor to load and to second capacitor and also to load, happens so often that the two inductors and the capacitors need not be very large.

The device carefully watches the DC input voltage and the load voltage and leaves the electronic switch ON only long enough to store enough energy to satisfy the present load based on the DC input voltage. If the DC input voltage goes up, then the electronic switch stays ON for less time as it collects its energy more quickly. If the load requirement changes, then the OFF time is varied to maintain the desired output voltage. In this way, the device can easily make changes in response to input and output variations at little cost and with little sensor requirement.

The device waits until the DC regulator output voltage exceeds 6.8V and then a comparator with hysteresis engages and does not disengage until the battery drops below 5.0V. Another comparator watches the regulator voltage and when it drops below a selected level due to power failure, both outputs are ANDed together and the result used to turn ON one of a variety of switch types, including relays or transistors, so as to connect the battery to the load. When the power goes on again, the hysteresis is reset on the first comparator and the second comparator goes low causing the AND output to shut off the switch and cut off the battery connection to the load. For the LEDs a separate connection is made apart from the switch through a diode from the regulator output. This allows the LEDs to operate directly from the regulator when it is ON and then to operate from the battery through the switch when power has failed. Lamps and other loads which do not have this bypass will turn on only when the battery is engaged.

A test switch is implemented by shorting the gate of the pulse switching field effect transistor (FET) to ground and interrupting the energy transfer process described above. When the regulator stops outputting energy to the inductor and capacitor circuits, the DC output voltage goes low which simulates a power failure. The pulse switching IC is initially powered from the DC input terminal, and, once the device is operating, from a secondary winding on the second inductor.

The battery charge voltage is regulated through a resistor divider to an error amplifier which varies the ON-time with input voltage and OFF-time with output voltage. The divider has a 2.5V reference, so dividing the desired voltage to 2.5V will force the feedback to maintain that voltage. By inserting a thermistor in the place of one of the resistors, we force the feedback loop to maintain 2.5V between the thermistor and resistor and therefore to vary the true output voltage. By choosing a thermistor which coincides with the battery manufacturer's suggested battery voltage with temperature curve we can maintain the correct charge voltage so as not to damage the battery.

Finally, the device employs a common-mode PI-configuration input filter to meet FCC-conducted emission requirements.

BRIEF DESCRIPTION OF THE DRAWINGS

Further objects, advantages and features of the present invention will appear from the following description, taken with the accompanying drawings, in which:

FIG. 2 is a block diagram of a pulse switching integrated circuit (IC) employed in the portion of the circuit illustrated in FIG. 1A.

DETAILED DESCRIPTION OF AN ILLUSTRATIVE EMBODIMENT

Figure 1A:
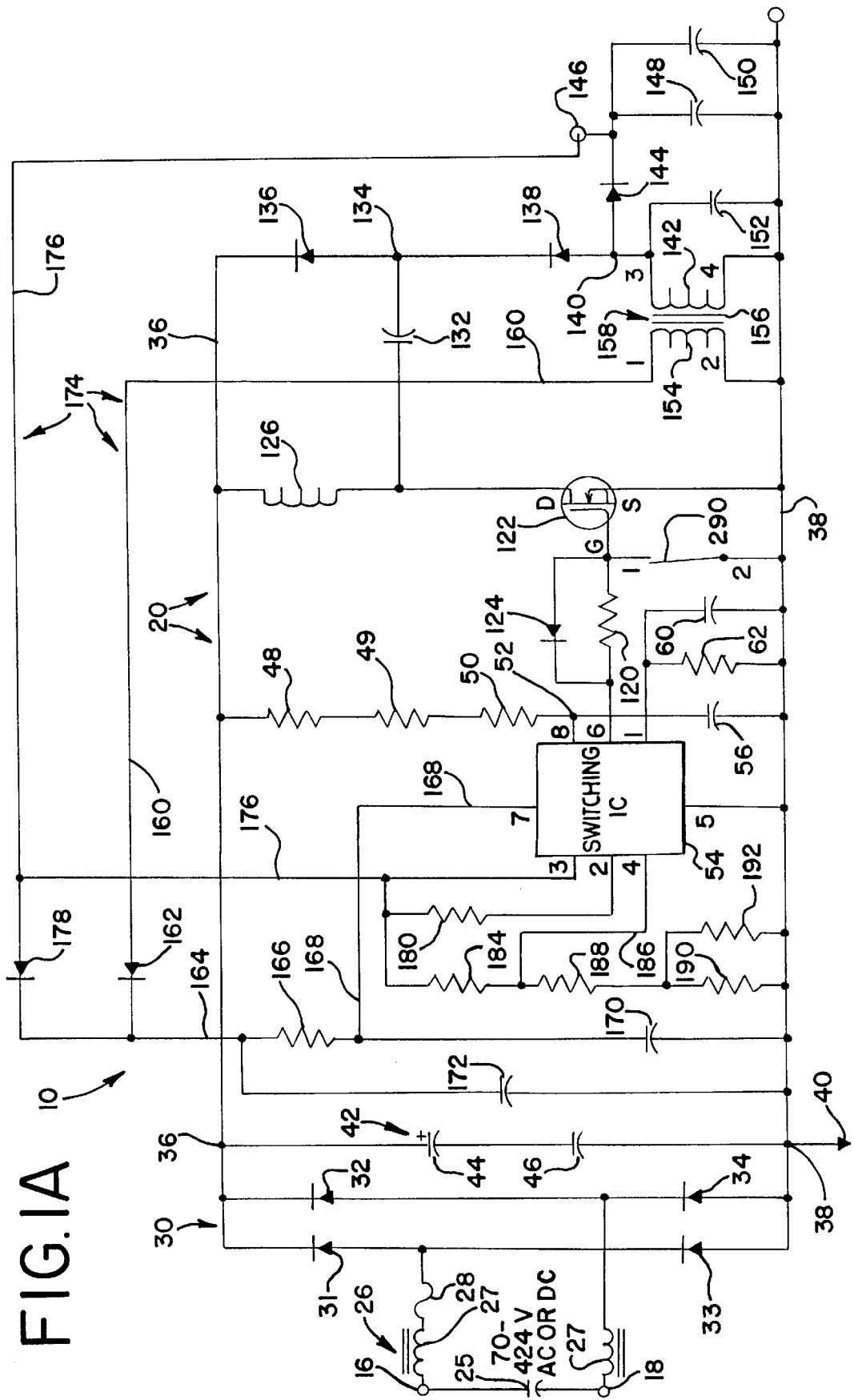
FIGS. 1A and 1B, taken together, constitute a schematic circuit diagram of an emergency light and exit sign having a backup battery and a pulse switching power supply for operating the exit sign and charging the battery, all constituting an illustrative embodiment of the present invention. The right-hand end of FIG. 1A and the left-hand end of FIG. 1B are to be connected together to form the complete schematic circuit diagram.
Figure 1B:
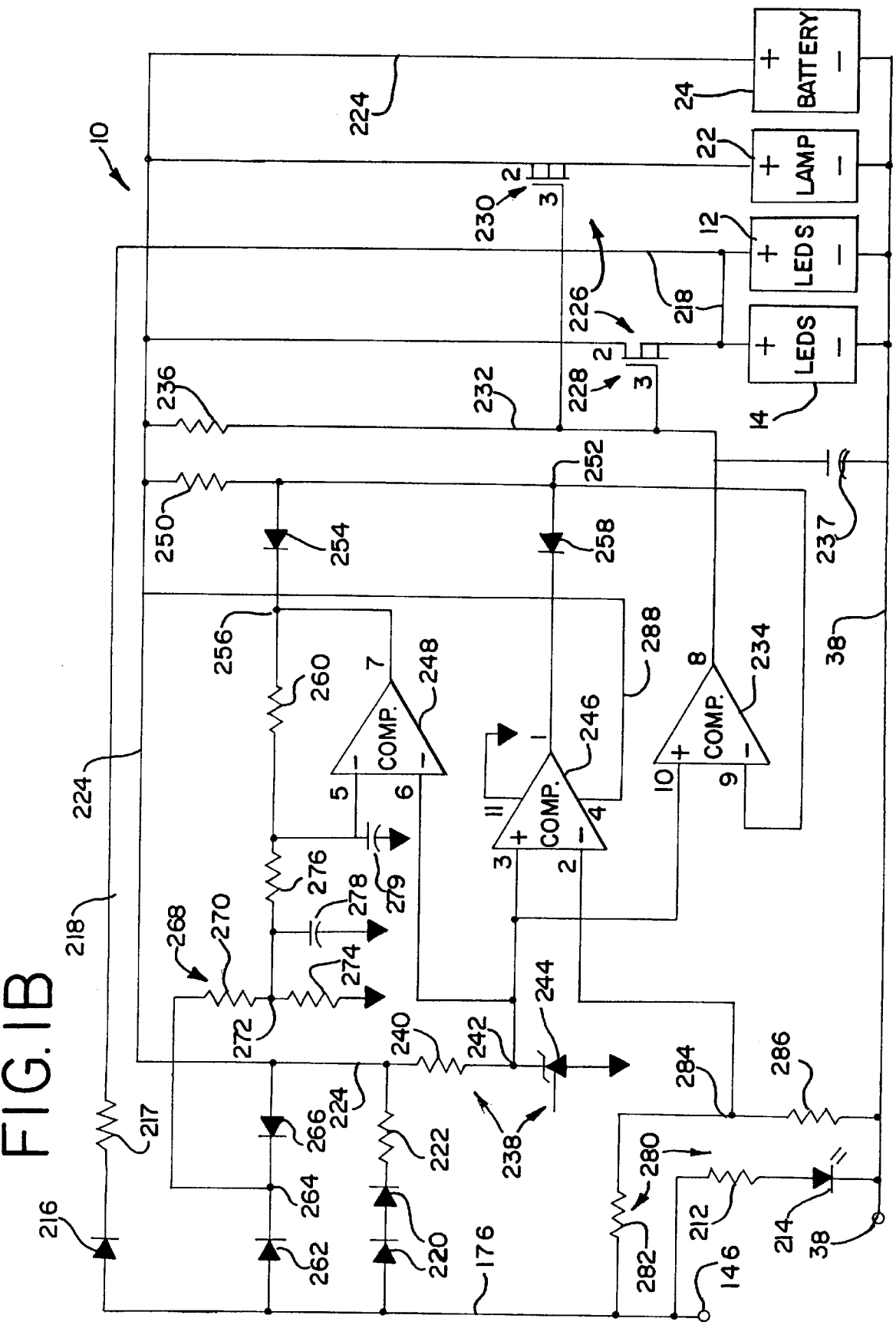

As just indicated, FIGS. 1A and 1B illustrate the circuit for an emergency exit sign 10 in which the word EXIT is illuminated by two groups of light-emitting diodes, abbreviated as LEDs 12 and 14 in FIG. 1B. Other types of electrically operable lamps can be employed, such as miniature fluorescent lamps, for example. The LEDs 12 and 14 are powered by an AC or DC operated power supply 20, when input voltage is present, and by battery power, during a power failure. The exit sign 10 also incorporates emergency lighting provided by a lamp 22 which comes on only when the primary power has failed and battery operation is required. Thus, the exit sign 10 actually constitutes a combined exit sign and emergency light, but, for brevity, will be referred to hereinafter as the exit sign 10.

As shown in FIG. 1A, the exit sign 10 has a pair of power input terminals 16 and 18, adapted to be connected to an AC or DC power line which may supply a voltage ranging from 70 to 424 volts. The power supply 20 is a pulse switching power supply or converter 20, constructed and arranged to convert the wide ranging input voltage into a well-regulated direct current (DC) output at approximately 7 volts, or some other voltage which is suitable for operating the LEDs 12 and 14. The emergency lamp 22, shown in FIG. 1B, is adapted to provide a certain amount of general illumination below and in the general neighborhood of the exit sign during a power failure. The lamp 22 may be a single incandescent lamp, or a plurality of such lamps or any other type of lamp or lamps adapted to produce general illumination.

As shown in FIG. 1B, the exit sign 10 includes a backup storage battery 24 which is rechargeable by the power supply 20 during input power operation and is adapted to operate the LEDs 12 and 14 and the lamp 22 if there is a failure in the input power. The battery 24 may provide approximately 6 volts or some other suitable voltage capable of operating the LEDs 12 and 14 and the lamp 22.

As shown in FIG. 1A, a PI-configuration input filter 26 is connected across the input terminals 16 and 18 to act as an electromagnetic interference (EMI) suppressor to meet FCC-conducted emission requirements. The illustrated filter 26 comprises a capacitor 25 connected directly across the input terminals 16 and 18 and a pair of inductors 27 in series with both of the input terminals 16 and 18. A protective fuse 28 is connected in series with the input terminal 16 and inductors 27.

A rectifier circuit or means 30 is connected through the PI-filter 26 and the fuse 28 to the input terminals 16 and 18, for rectifying the high voltage input and producing a corresponding rectified direct current (DC) voltage. As shown in FIG. 1A, the rectifier circuit 30 comprises four high voltage rectifier diodes 31, 32, 33 and 34 connected in a conventional bridge rectifier circuit which produces a full wave rectified DC voltage between terminals or conductors 36 and 38, the latter of which is connected to power or circuit ground 40. Preferably, most of the components of the exit sign 10 are mounted on a printed circuit board, so that the terminals or conductors are in t he form of electrically conductive members on the surface of t he board. Numerous connections are made to the power ground conductor 38, and several connections are made to the ungrounded, high voltage conductor 36.

The rectifier means or circuit 30 also comprises filter means 42 for smoothing the rectified DC voltage and reducing the magnitude of the pulsations thereof. As shown, the filter means 42 comprise two filter capacitors 44 and 46, connected in series between the high voltage DC terminals 36 and 38. The capacitors 44 and 46 are connected in series so as to divide the high voltage between them so that the capacitors will withstand the high DC voltage which can exist between the terminals.36 and 38.

As shown in FIG. 1A, three resistors 48, 49 and 50 are connected in series between the high voltage DC conductor or bus 36 and a conductor 52 connected to input pin 8 of a pulse switching integrated circuit (IC) 54. Pin 8 is labeled T ON in FIG. 2. A low value filtering or bypass capacitor 56 is connected between the conduct or 52 and power ground 38. The pulse switching IC 54 is preferably a commercially available offline power supply control integrated circuit, UNITRODE TYPE UCC3889, but other commercially available switching type power supply control circuits can be employed. A block diagram of the integrated circuit 54 is shown in FIG. 2, which will be explained in detail presently. It will be seen from FIG. 1A that pin 5 of the IC 54 is connected to the power starting current to the IC 54 and also regulate the ON-time current of the RC timer or oscillator, to be described presently.

When DC current is supplied to pin 8 of the IC 54, it produces high frequency switching pulses which are variable in frequency and duty cycle. The pulses are supplied to output pin 6 which is labeled DRIVE in the block diagram of FIG. 2. The frequency of the drive pulses is subject to wide variation, but preferably ranges between approximately 20 and 100 kilohertz, for example. The small duty cycle is varied by the controller IC 54. The control of the duty cycle makes it possible to convert the high voltage DC input to a low voltage DC output.

As shown in FIG. 2, the IC 54 comprises an RC oscillator circuit 58 which alternately charges and discharges a capacitor 60, shown in FIG. 1A. The capacitor 60 is connected between pin 1 of the IC 54 and the power ground 38. A high value resistor 62 is connected in parallel with the capacitor 60 to discharge it during the oscillatory cycles.

As shown in FIG. 2, the switching IC 54 comprises a pair of FET switching transistors 64 and 66 connected in a mirror circuit for charging the capacitor 60 when current is supplied to the T ON pin 8 of the IC 54. The capacitor 60 is charged through the series connected resistors 48, 49 and 50, the switching transistor 64 and pin 1, labeled CT in FIG. 2. The charging current into the capacitor 60 is limited by the total resistance of the resistors 48, 49 and 50 and is a direct function of the DC input voltage, so that any increase in the DC voltage causes an increase in the charging current.

The discharge of the capacitor 60 is controlled by another pair of FET switching transistors 68 and 70 which are components of the switching IC 54 and are connected in another mirror circuit. The discharge current from the capacitor 60 is carried by the transistor 68 but is controlled by the transistor 70 having its input connected to pin 2 of the IC 54.

The variable duty cycle pulses across the capacitor 60 are transmitted by a conductor 72 to the inverting input of an operational amplifier 74 and also to the non-inverting input of another operational amplifier 76. The output of the operational amplifier 74 is connected to the set input 78 of an RS flip-flop 80. The output of the operational amplifier 76 is connected to the first reset input 82 of the flip-flop 80. The output terminal 84 of the flip-flop 80 is connected by an amplifier 86 to the DRIVE output pin 6 of the integrated circuit 54. The output signals from the operational amplifiers 74 and 76 are effective to switch the flip-flop 80 between high and low drive output based upon the sawtooth waveform at pin 1 of the IC 54 and across the capacitor 60 which is connected to pin 1.

The operating voltage Vcc for the IC 54 is supplied to pin 7 of the IC 54. A Vcc conductor 90 is connected to pin 7. The operating voltage is clamped or regulated at approximately 9 volts by a 9 volt zener diode 92, connected between the Vcc conductor 90 and the grounded pin 5 of the IC 54. Voltage divider resistors 94, 96 and 98 are connected in series between the Vcc conductor 90 and ground. The junction between the resistors 94 and 96 is connected to the inverting input of the operational amplifier 76. The junction between the resistors 96 and 98 is connected to the non-inverting input of the operational amplifier 74. In this way, reference or biasing voltages are provided for the operational amplifiers 74 and 76.

The Vcc conductor 90 is connected to the inverting input of a comparator 100 having its output connected to the second reset input 102 of the flip-flop 80. A reference voltage of 8.4 volts is connected to the non-inverting input of the comparator 100, which is labeled Vcc OK Comp in FIG. 2. The comparator 100 will reset the output of the flip-flop 80 in the event of undervoltage to the IC 54.

Another comparator 104 is provided to monitor the status of the input line voltage to the exit sign 10. The output of the comparator 104 is connected to the third reset input 106 of the flip-flop 80. A time delay capacitor 108 is connected between the output of the comparator 104 and ground. The value of the capacitor 108 is preferably such as to produce a time delay of approximately 0.5 milliseconds. The non-inverting input of the comparator 104 is connected to a reference voltage of approximately 1.25 volts. Normally, when the DRIVE output pin 6 of the IC is high, the inverting input of the comparator 106 is connected through a two-position switch 110 to a junction conductor 112 between the output electrode of the transistor 66 and a resistor 114 connected between the conductor 112 and ground. When the AC line voltage to the input terminals 16 and 18 is within the normal range, high frequency voltage pulses apear across the resistor 114 and are supplied to the inverting input of the comparator 104. In the absence of such pulses, the comparator 104 is operative to shut down the flip-flop 80. The switch 110 has a second position in which the inverting input of the flip-flop 104 is connected to the Vcc conductor 90, when the DRIVE pin 6 is low.

Another two-position switch 116 is connected to the input pin 8 of the integrated circuit 54 and is normally operative to connect the input pin 8 to a conductor 118 extending to the transistors 64 and 66 so that they are operative when the DRIVE pin 6 is high. The switch 116 is operable to another position in which the input pin 8 is connected to the Vcc conductor 90, when the DRIVE output pin 6 is low.

When the AC input line voltage is within the normal range, the IC 54 produces high frequency pulses of generally saw-tooth or triangular wave form across the capacitor 56, connected to pin 1 of the IC 54. The pulses are transmitted by the conductor 72 and the operational amplifiers 74 and 76 to the flip-flop 80, which produces corresponding high frequency pulses of a generally square wave form at the DRIVE output pin 6 of the IC 54. The duty cycle of the square output pulses corresponds with the variable duty cycle of the generally triangular pulses across the capacitor 56.

The variable duty cycle, square wave pulses at the DRIVE output pin 6 of the IC 54 are supplied through a low value resistor 120 to the gate of a switching transistor 122 which is preferably of the MOSFET, N CHANNEL type. The resistor 120 sets the turn on time of the switching transistor 122. A diode 124 is connected across the resistor 120. The diode minimizes the turn off time of the switching transistor 122. The SOURCE output electrode of the transistor 122 is connected to the power ground conductor 38. A first inductor 126 is connected between the DRAIN output electrode of the transistor 122 and the high voltage DC conductor 36.

A capacitor 132, a junction conductor 134 and a diode 136 are connected in series across the inductor 126. The capacitor 132 preferably has a relatively high value, such as 0.47 to 10 microfarads. The diode 136 is connected between the high voltage DC conductor 36 and the junction conductor 134, but the diode 136 is polarized to conduct current in the opposite direction. A series circuit comprising a diode 138, a junction conductor 140, and a second inductor 142 is connected between the junction conductor 134 and the power ground conductor 38. The diode 138 is polarized in with anode to conductor 140 and cathode to conductor 134.

During normal operation, the gate of the switching transistor 122 is supplied with a train of low duty cycle square wave pulses. During each pulse, the transistor 122 becomes conductive so that the first inductor 126 is effectively connected between the positively polarized high voltage DC conductor 36 and the negatively polarized power ground conductor 38. Energy is stored in the magnetic field of the inductor 126 as the DC voltage across its terminals induces a linear rise in the inductor current. When the transistor 122 becomes non-conductive, the collapsing magnetic field of the inductor 126 causes a continued current to flow therein with the result that the capacitor 132 is charged through the diode 136. Thus, much of the energy which was stored in the inductor 126 is transferred to the capacitor 132. The polarization of the diode 136 prevents the capacitor 132 from discharging through the first inductor 126.

When the transistor 122 is conductive, the capacitor 132 discharges through the transistor 122 and through the series circuit comprising the second inductor 142, the junction conductors 38 and 140, the diode 138 and the junction conductor 134. Thus, the energy stored in the capacitor 132 is largely transferred to the second inductor 142. In this way, voltage pulses are produced across the second inductor 142.

A high current rectifying diode 144 is connected between the junction conductor 140 and a DC output terminal 146. A storage and filtering capacitor 148 is connected between the output terminal 146 and the power ground conductor 38. Another capacitor 150 of relatively low value is connected in parallel with the capacitor 148 for bypassing high frequency noise. The value of the capacitor 150 may be approximately 170 picofarads, for example.

In accordance with one feature of the present invention, the second inductor 142 has a secondary winding 154 which is interwound with or otherwise closely coupled to the inductor 142. The inductor 142 and the secondary winding 154 are wound around a magnetic core 156 made of ferrite or the like. The inductor 142, the secondary winding 154 and the magnetic core 156 constitute a high frequency transformer 158.

One end of the secondary winding 154 is connected to the power ground conductor 38. The other end of the winding 154 is connected by a series circuit comprising a conductor 160, a rectifying diode 162, another conductor 164, a resistor 166 and still another conductor 168 to the input pin 7 of the switching IC 54. In FIG. 2, pin 7 is labeled Vcc and is the pin at which the operating voltage for the IC 54 appears. A filter capacitor 170 is connected between the conductor 168 and the power ground conductor 38. The resistor 166 has a voltage dropping effect and may have a value of about 1.2 kilohms. The resistor 166 also limits the current through the 9-volt zener diode 92 in the IC 54. The filter capacitor 170 may have a value of 3.3 microfarads, for example, and may be of the electrolytic or ceramic type. Another filter capacitor 172 is connected between the conductor 164 and the power ground conductor 38 and may be of the ceramic type, having a value of one microfarad, for example. It will be understood that the secondary winding 154, rectifying diode 162, the resistor 166 and the capacitors 170 and 172 constitute components of a steady state power supply 174 for the operating voltage Vcc of the IC 54. Initially, the IC 54 is supplied with power through the resistors 48, 49 and 50.

As shown in FIG. 1A, the power supply 174 also comprises a conductor 176 and a diode 178 connected in series between the DC output terminal 146 and the conductor 164 to which the diode 162 is also connected. With this circuit, either the diode 162 or the diode 178, whichever supplies the higher voltage, will supply the operating voltage to the IC 54.

The conductor 176 from the DC output terminal 146 is also connected directly to terminal pin 3 of the IC 54. In FIG. 2, terminal pin 3 is labeled Vout in FIG. 2.

As shown in FIG. 1A, a resistor 180 is connected between the conductor 176 and terminal pin 2 of the IC 54, which is labeled Toff in FIG. 2. In the IC 54, a conductor 182 is connected between terminal pin 2 and the current mirror made of the transistors 68 and 70. The resistor 180 may have a value of 82 kilohms, for example, and sets the off drain current of the RC timer.

As shown in FIG. 1A, a resistor 184 and a conductor 186 are conducted in series between the DC output conductor 176 and terminal pin 4 of the IC 54. In FIG. 2, terminal pin 4 is labeled ADJ, which is an abbreviation of the word ADJUST. In FIG. 1A, resistors 188 and 190 are connected in series between the conductor 186 and the power ground conductor 38. A thermistor 192 is connected in parallel with the resistor 190. Each of the resistors 184 and 188 may have a value of approximately 7.5 kilohms, for example. The resistor 190 may have a value of approximately 2.2 kilohms. The circuit comprising the resistors 184, 188 and 190 and the thermistor 182 acts as a voltage divider for supplying terminal pin 4 of the IC 54 with a fraction of the DC output voltage supplied by the DC output conductor 176. The thermistor 192 varies the output voltage with temperature so that it will inexpensively approximate the float voltage specified by the float voltage vs. temperature curves recommended by the battery manufacturers.

In the IC 54, as shown in FIG. 2, a conductor 194, a resistor 196 and a diode 198 are connected in series between terminal pin 3 and the Vcc conductor 90 which is connected to terminal pin 7. These components constitute an alternate power supply path between terminal pins 3 and 7. This path is unused when Vout is below 9V.

A resistor 200 and a conductor 202 are connected between terminal pin 4 and the inverting input of a transconductance amplifier 204. A regulated bias voltage of 2.5 volts is supplied to the non-inverting input of the transconductance amplifier 204. A diode 206 is connected between the conductor 182 and the output of the transconductance amplifier 204. As previously described, the conductor 182 is connected between terminal pin 2 and the current mirror transistors 68 and 70. A resistor 208 is connected between the inverting input of the transconductance amplifier 204 and power ground. A resistor 210 is connected between the conductor 202 and the conductor 194 which is connected to terminal pin 3. The resistors 200, 208 and 210 may have approximate values of 50 kilohms, 30 kilohms and 116 kilohms, respectively, for example.

The transconductance amplifier 204 accepts a voltage input but draws current through the diode 206 on its output to alter the discharge rate of the timing capacitor 60 which is connected to terminal pin 1 of the IC 54. The voltage input to the transconductance amplifier 204 is derived from terminal pin 4 of the IC 54.

The control apparatus involving the IC 54 works by varying frequency and duty cycle of the oscillator pulses through the following means:
  i) R(on) sets the charging current through the transistor 64 and into the capacitor 60 for the timing ramp waveform;
  ii) R(off) sets the discharging current through the transistor 68 and from the capacitor 60 for the timing ramp waveform;
  iii) The transconductance amplifier 204 uses a voltage divider to remove current more or less quickly from the timing capacitor 60, thus changing the duty cycle. The transconductance control loop has the purpose of maintaining constant voltage on the adjust pin 4 of the IC 54 by operating in the manner described above.

As shown in FIG. 1A, the voltages at terminal pins 2 and 4 of the IC 54 are derived through the resistors 180 and 184 from the DC output conductor 176. The IC 54 and the associated circuits are constructed and arranged so that any increase in the DC output voltage on the conductor 176 decreases the duty cycle of the pulses produced by the IC 54. In this way, the DC output voltage is regulated and is maintained at approximately 6.7 volts, for example.

The power ground terminal or conductor 38 and the DC output terminal 146 appear in both FIG. 1A and FIG. 1B. In FIG. 1B, a resistor 212 and a light-emitting diode (LED) 214 are connected in series between the DC power supply terminal 146 and the power conductor 38. The LED 214 provides a POWER PRESENT indicator light.

The DC output conductor 176 also appears in both FIGS. 1A and 1B and is connected to the DC output terminal 146. A diode 216, a resistor 217 and a conductor 218 are connected in series between the DC output conductor 176 and the LEDs 12 and 14. Thus, the LEDs 12 and 14 are connected in parallel. When the high voltage AC input voltage is within the normal range, the LEDs 12 and 14 are energized by a current flowing from the DC output conductor 176 through the diode 216, the resistor 217 and the conductor 218. The diode 216 prevents reverse charging of the battery 24 through the FET 228.

To provide for charging the storage battery 24, two series-connected diodes 220, a resistor 222 and a conductor 224 are connected between the DC output conductor 176 and the positive terminal of the battery 24. The negative terminal of the battery 24 is connected to the power ground conductor 38.

As shown in FIG. 1B, switching means 226 are provided for connecting the storage battery 24 to the LEDs 12 and 14 and also to the lamp 22, if there is a failure in the high voltage AC supply at the AC input terminals 16 and 18. The switching means 226 comprise switching transistors 228 and 230 which preferably are of the MOSFET P-CHANNEL type. The drain and source of the transistor 228 are connected between the battery voltage conductor 224 and the conductor 218 to which the LEDs 12 and 14 are connected. The drain and source of the transistor 230 are connected between the conductor 224 and the lamp 22 which is operated by the battery 24 during AC power failure, as long as the battery voltage is above cutoff. The gates of both transistors 228 and 230 are connected to a conductor 232 which is connected to the output of a comparator 234, labeled COMP in FIG. 1B. A pull up resistor 236 is connected between the conductor 224 and the conductor 232 which extends to the output of the comparator 234. The resistor 236 may have a resistance of approximately 100 kilohms, for example. A noise reducing capacitor 237 is also connected between the conductor 232 and power ground 38.

As shown in FIG. 1B, a reference voltage source 238 is provided for the non-inverting input of the comparator 234. The illustrated reference source 238 comprises a resistor 240, a conductor 242 and an integrated voltage reference 244 which may have a stabilized operating-voltage of approximately 2.5 volts, for example. The current limiting resistor 240 may have a resistance of approximately 3 kilohms, for example. The conductor 242 is connected to the non-inverting input of the comparator 234 and also to the non-inverting input of a second comparator 246 and the inverting input of a third comparator 248.

As shown in FIG. 1B, a pull up resistor 250, a conductor 252 and a diode 258 are connected in series between the battery voltage conductor 224 and the output terminal of the second comparator 246. The resistor 250 may have a resistance of approximately 100 kilohms, for example. The conductor 252 is also connected to the inverting input of the first comparator 234.

A diode 254 and a conductor 256 are connected between the conductor 252 and the output of the third comparator 248.

A resistor 260 is connected between the conductor 256 and the non-inverting input of the third comparator 248, to provide comparator hysteresis. The resistor 260 may have a high resistance of approximately 1 megohm, for example.

A diode 262 is connected between the DC power supply conductor 176 and a conductor 264. Another diode 266 is connected between the battery voltage conductor 224 and the conductor 264. With this connection, the conductor 264 is supplied with either the DC power supply voltage or the battery voltage, whichever is higher.

To form a voltage dividing circuit 268, a resistor 270, a conductor 272 and another resistor 274 are connected in series between the conductor 264 and power ground. The resistors 270 and 274 may have resistance values of 63.4 kilohmns and 51.1 kilohms, for example. A resistor 276 is connected between the conductor 272 and the non-inverting input of the third comparator 248. The resistor 276 may have a resistance of 243 kilohmns, for example. A bypass capacitor 278 is connected between the conductor 272 and power ground. Another bypass capacitor 279 is connected between the non-inverting input of the comparator 248 and power ground. The capacitors 278 and 279 bypass AC to produce a solid DC reference. The capacitor 278 may have a capacitance of approximately 0.1 microfarad, for example.

To form another voltage dividing circuit 280, a resistor 282, a conductor 284 and a resistor 286 are connected in series between the DC power supply conductor 176 and the power ground conductor 38. The resistors 282 and 286 may have resistance values of 162 kilohms and 100 kilohms, respectively, for example. The conductor 284 has a branch which is connected directly to the inverting input of the comparator 246.

The comparators 234, 246 and 248 preferably constitute components of a single integrated circuit, which may also include the 2.5-volt zener diode 244. The pin numbers of the integrated circuit are shown in FIG. 1B, adjacent the various terminals of the comparators 234, 246 and 248. The positive operating voltage for the comparators 234, 246 and 248 is supplied by a conductor 288 connected between the battery voltage conductor 224 and pin 4, shown adjacent the comparator 246. Pin 11 is connected to power ground to supply the necessary connection to the negative battery terminal to which the power ground conductor 38 is connected.

As shown in FIG. 1A, a test switch 290 is provided for simulating an AC power failure, so that the automatic switch-over to battery power can easily be tested. The test switch 290 is of the momentary closure, spring return type and is connected between the gate of the transistor 122 and the power ground conductor 38. The closure of the switch by the operator short circuits the gate to power ground so that pulses cannot be transmitted from the switching IC 54 to the switching transistor 122. Consequently, no DC output voltage can be produced at the output terminal 146. Thus, closure of the test switch 290 produces the same result as complete loss of input voltage across the input terminals 16 and 18.

The comparators 234, 246-and 248 function so as to determine the conditions under which the battery 24 is charged by the DC power supply voltage on the terminal 146, and also the conditions under which the battery 24 is connected to the LEDs 12 and 14 and the lamp 22 for emergency energization thereof. When the battery 24 is first installed in the exit sign 10 at the factory or in the field, the circuits comprising the comparators 234, 246 and 248 function so that the battery is not connected to the LEDs 12 and 14 and the lamp 22, even though no power supply voltage is being supplied to the input terminals 16 and 18. The comparator circuits function so that the battery 24 will not be connected to the LEDs 12 and 14 and the lamp 22 until the power supply voltage has been fully cycled, first ON and then OFF.

When the battery 24 is first connected between the battery voltage conductor 224 and the power ground conductor 38, the comparators 234, 246 and 248 are supplied with operating voltage by the conductor 288. The battery voltage is applied to the voltage reference 244 by the resistor 240, so that the reference of 2.5 volts is produced on the conductor 242 and is supplied to the non-inverting inputs of the comparators 234 and 246 and the inverting input of the comparator 248.

Because there is no voltage between the DC power supply terminals 146 and 38, zero voltage is supplied by the voltage divider 280 and the conductor 284 to the non-inverting input of the comparator 246. Consequently, the comparator 246 is conductive so that it draws a certain amount of current through the pull up resistor 250.

Because the battery 24 is not fully charged when it is first installed, the battery voltage is somewhat less than 6 volts. The voltage divider 268 supplies less than 2.5 volts to the non-inverting input of the comparator 248. Consequently, the output of the comparator 248 is non-conductive, so that the comparator 248 does not draw any current through the pull up resistor 250. The resistance value of the resistor 250 is sufficiently small so that the outputs of both of the comparators 246 and 248 must be conductive in order to draw down the voltage on the inverting input of the comparator 234 to a value less than 2.5 volts. Consequently, in the initial condition, with the output of the comparator 246 conductive and the output of the comparator 248 non-conductive, the voltage on the non-inverting input of the comparator 234 is greater than 2.5 volts, so that the output of the comparator 234 is non-conductive and the output voltage supplied to the gates of the MOSFETs 226 and 230 is high. As a result, the MOSFETs 228 and 230 are non-conductive, so that the battery 24 is not connected to the LEDs 12 and 14 and the lamp 22.

The situation changes when normal input voltage is supplied to the input terminals 16 and 18, so that the DC voltage of approximately 6.7 volts is supplied between the terminals 146 and 38. The DC voltage supplied to the inverting input of the comparator 246 is greater than 2.5 volts, so that the output of the comparator 246 is non-conductive. The voltage supplied to the non-inverting input of the comparator 248 is greater than 2.5 volts, so that the output of the comparator 248 is conductive. However, because only one of the comparators 246 and 248 is conductive, the current through the pull up resistor 150 draws down the voltage at the inverting input of the comparator 234 to a value greater than 2.5 volts. Accordingly, the output of the comparator 234 is non-conductive, so that the output of the comparator 234 is high and the high output is supplied through the gates of the MOSFETs 228 and 230, so that they are non-conductive. Thus, the lamp 22 is not energized. However, the LEDs 12 and 14 are energized through the diode 216 and the resistor 217.

If a power failure should occur, the output voltage of the DC power supply between the terminals 146 and 38 drops to zero. However, the 2.5-volt reference voltage is still derived from the battery and is still supplied to the non-inverting inputs of the comparators 234 and 246 and the inverting input of the comparator 248. Because of the power failure, the voltage at the inverting input of the comparator 246 drops to zero, so that the output of the comparator 246 is conductive. The diode 266 and the voltage divider 268 supply more than 2.5 volts to the non-inverting input of the comparator 248, so that its output is also conductive. Thus, the outputs of both comparators 246 and 248 draw current through the pull up resistor 250, so that the voltage supplied to the inverting input of the comparator 234 drops below 2.5 volts. Accordingly, the output of the comparator 234 becomes conductive so that the output voltage goes low. This low voltage is supplied to the gates of the MOSFETs 228 and 230 so that both of them become conductive. Consequently, the LEDs 12 and 14 and the lamp 22 are connected to the battery 24 and are energized for emergency operation.

During normal AC operation, the battery 24 is charged through the diodes 220 and the resistor 222. The LEDs 12 and 14 are energized through the diode 216 and the resistor 217. However, the lamp 22 is not energized, because the MOSFET 230 is non-conductive, as previously explained.

Battery manufacturers recommend that 6-volt lead-acid storage batteries should not be discharged below 5.0 volts. For this reason, the comparator circuits associated with the comparator 248 are constructed and arranged so as to disconnect the battery 24 from the LEDs 12 and 14 and the lamp 22 when the voltage of the battery 24 drops below 5.0 volts. A fraction of the battery voltage is supplied to the non-inverting input of the comparator 248 by the circuit comprising the diode 266, the voltage divider 268 and the resistor 276. The current through the feedback resistor 260 also affects the voltage at the non-inverting input of the comparator 248. The resistance values of these resistors are selected so that the non-inverting input voltage will drop below 2.5 volts when the battery voltage drops below 5.0 volts. When the 2.5-volt reference voltage at the inverting input exceeds the voltage at the non-inverting input of the comparator 248, the output thereof becomes non-conductive so that it no longer draws current through the diode 254 and the pull up resistor 250. This change has the effect of increasing the voltage at the inverting input of the comparator 234 above the reference voltage of 2.5 volts at the non-inverting input thereof. As a result, the output of the comparator 234 becomes non-conductive and goes high, so that the MOSFETs 228 and 230 are switched to their non-conductive states, whereby the LEDs 12 and 14 and the lamp 22 are switched OFF.

This situations continues until the AC input is restored so that the DC output voltage is again produced between the terminals 146 and 38, whereupon the LEDs 12 and 14 are energized through the diode 216 and the resistor 217. When the DC output voltage exceeds 5.0 volts, the battery 24 is charged through the diodes 220 and the resistor 222. When the AC input voltage is within its normal range, such DC output voltage is regulated at approximately 6.7 volts. The voltage at the inverting input of the comparator 246 exceeds the 2.5-volt reference at the non-inverting input so that the output of the comparator 246 becomes non-conductive, whereupon the voltage at the inverting input of the comparator 234 goes higher than the 2.5-volt reference at the non-inverting input, so that the output of the comparator 234 is non-conductive. Accordingly, the output voltage of the comparator 234 goes high and is applied to the gates of the MOSFETs 228 and 230, so that they are switched off. Accordingly, the lamp 22 is not energized.

When the DC voltage between the terminals 146 and 38 rises to approximately 6.7 volts, the output of the comparator 248 becomes conductive, because the voltage at the non-inverting input of the comparator 248 exceeds the 2.5-volt reference at the inverting input thereof. Although the output current of the comparator 248 draws down the voltage on the inverting input of the comparator 234 to some extent, such voltage is greater than the 2.5-volt reference at the non-inverting input, so that the output of the comparator 234 remains non-conductive, and the MOSFETs 228 and 230 remain non-conductive.

The comparators 246 and 248 and the associated circuits act in the manner of an AND gate or logic means, in that both of the comparators 246 and 248 must be switched to conductive states in order to switch the comparator 234 to its conductive state whereby the MOSFETs 228 and 230 are switched to conductive states. If either of the comparators 246 and 248 is switched to a non-conductive state, the comparator 234 and the MOSFETs 228 and 230 are switched to non-conductive states.

This invention provides means for conversion from AC or DC line voltage between 70 and 424 volts to small loads between 2.5V and 18V DC for charging of batteries and operating of small loads. The invention includes a temperature control technique for proper battery charging and a method by which to cutoff the battery from the load before over-discharging occurs. The invention does not allow the battery to engage until the line voltage has been applied. The invention uses a topology including two flyback stages in tandem. We are using a low cost control device to implement this topology, but the control device is applicable to several different topologies, only one of which is the tandem flyback circuit. This invention has many uses and we are believed to be the first to apply it to battery charging and the operation of small loads. The invention has feedback both from the input line voltage and output voltage to allow different loads and to allow the universal voltage input. The invention does not require any extra input connections to operate at different voltages. The invention operates at high frequency and thus eliminates large transformers and uses surface mount components. All of this results in its very small size, low heat generation, and high efficiency. The invention includes a novel test switch which grounds the gate of the primary electronic switch rather than cutting off the main power loop to achieve Underwriters Laboratories (UL) requirements for a power failure test switch. The invention draws very little power when connected only to a battery without input power having been applied. Primary applications for this invention include low powered uninterrupted power-supply (UPS) devices. As disclosed herein, our first application is an emergency lighting device combined with an exit sign. However, we may use the same power supply for lighting equipment, lighting sensors, smoke detectors, burglar alarms, passive receivers, infrared detectors, ultrasonic detectors, stand-alone battery chargers, communications equipment or any other device which has a small load or requires charging with a battery from high input line voltages, such as 120V and higher.

Persons skilled in the art will be able to select appropriate values, types and other characteristics of the various electronic components employed in the present invention. In many cases, the values and other characteristics are subject to considerable discretionary variations. However, to assist persons skilled in the art to utilize the present invention, the following tables of workable and preferred component values, types and other characteristics are being included herein.

| Capacitors | Capacitance & Voltage |
|---|---|
| 25 | 0.1uf,1 400v |
| 44 | 33uf, 350v |
| 46 | 33uf, 350v |
| 56 | 170pf |
| 60 | 390pf |
| 132 | 0.47uf, 160v |
| 148 | 100uf, 16v |
| 150 | 170pf |
| 170 | 3.3uf, 50v |
| 172 | 1uf, 25v |
| 237 | 0.1uf, 50v |
| 278 | 1uf, 25v |
| 279 | 0.1uf, 50v |

| Resistors | Resistance Ohms |
|---|---|
| 48 | 100K |
| 49 | 100K |
| 50 | 100K |
| 62 | 1.8 MEG |
| 120 | 22 ohms |
| 166 | 2.2K |
| 180 | 82K |
| 184 | 7.5K |
| 188 | 7.5K |
| 190 | 2.2K |
| 192 | Thermistor |
| 212 | 1K |
| 217 | 1 ohm |
| 222 | 2.4 ohms |
| 236 | 100K |
| 240 | 3K |

-continued

| | |
|---|---|
| 250 | 100K |
| 260 | 1 MEG |
| 270 | 63.4K |
| 274 | 51.1K |
| 276 | 243K |
| 282 | 162K |
| 286 | 100K |

| Diodes | Ratings |
|---|---|
| 31 | 1000V, 1A |
| 32 | 1000V, 1A |
| 33 | 1000V, 1A |
| 34 | 1000V, 1A |
| 124 | 50V, 0.15A, 4ns |
| 136 | 600V, 3A, 75ns |
| 138 | 600V, 3A, 75ns |
| 144 | 50V, 3A, 35ns |
| 162 | 1000V, 1A |
| 178 | 50V, 0.15A, 4ns |
| 214 | LED |
| 216 | 1000V, 1A |
| 220 | 1000V, 1A |
| 220 | 1000V, 1A |
| 254 | 50V, 0.15A, 4ns |
| 258 | 50V, 0.15A, 4ns |
| 266 | 50V, 0.15A, 4ns |
| 282 | 50V, 0.15A, 4ns |

| Transistors | Type |
|---|---|
| 122 | MOSFET, N-CHANNEL |
| 228 | MOSFET, P-CHANNEL |
| 230 | MOSFET, P-CHANNEL |

| Inductors | Description |
|---|---|
| 27 | 100uh, 0.15A MIN |
| 126 | Toroidal Inductor, Single |
| 142 | Toroidal Inductor, Double |

| Integrated Circuits | Description |
|---|---|
| 54 | Offline Supply Controller |
| 234, 246, 248 | Quad Comparator |
| 244 | Voltage Reference, 2.5V |

Various modifications, alternative constructions and equivalents may be employed without departing from the true spirit and scope of the present invention as disclosed herein and in the accompanying drawings, and as claimed in the appended claims.

We claim:

1. Electrical apparatus, comprising the combination of a power supply for converting a wide ranging relatively high alternating current (AC) or direct current (DC) input voltage from a power line into a regulated relatively low direct current (DC) output voltage, said power supply comprising an input circuit for receiving the AC or DC input voltage from the power line, said input circuit comprising rectifier means for rectifying the input voltage if it is AC and for passing the input voltage if it is DC, and filter means connected to said rectifier means for producing a filtered DC voltage;

an electronic switching circuit for producing a train of brief pulses having a variable duty cycle;

said switching circuit comprising first regulator means for varying the duty cycle of said pulses as an inverse function of the voltage from said rectifier means and said filter means so that an increase in said voltage causes a decrease in said duty cycle;

a tandem flyback circuit connected to said filter means for receiving the filtered DC voltage therefrom;

said tandem flyback circuit comprising a first inductor and an electronic switch connected in series across the DC voltage from said filter means;

said electronic switch having a pair of main electrodes connected in series with said first inductor and a control electrode connected to said switching circuit for receiving the variable duty cycle pulses therefrom whereby said electronic switch is conductive during each pulse and is non-conductive during the intervals between said pulses;

a series circuit comprising first and second diode rectifiers and a second inductor connected in series across the filtered DC voltage from said filter means;

said first and second diode rectifiers being polarized so as to be back-biased by said filtered DC voltage, said first inductor and said electronic switch having a first junction therebetween;

said first and second diode rectifiers having a second junction therebetween;

a first storage capacitor connected between said first and second junctions, an output circuit comprising a third diode rectifier, a first output conductor and a second storage capacitor connected in series across said second inductor;

said first inductor being adapted to be charged with energy when said electronic switch is conductive;

said first inductor being adapted to discharge said energy into said first storage capacitor and through said first diode rectifier when said electronic switch is non-conductive;

said first storage capacitor being adapted to be discharged by said electronic switch through said second inductor and said second diode rectifier when said electronic switch is conductive;

said second inductor being adapted to supply output current through said third diode rectifier to said output conductor and said second storage capacitor when said electronic switch is nonconductive;

and a small electrical load connected to said output conductor and across said second storage capacitor, said small electrical load having small but substantial power consumption.

2. Electrical apparatus according to claim 1,
in which said small load comprises lighting equipment.

3. Electrical apparatus according to claim 1,
in which said small load comprises an illuminated exit sign.

4. Electrical apparatus according to claim 1,
in which said small load comprises an illuminated exit sign having a battery charger for charging a backup battery.

5. Electrical apparatus according to claim 1,
in which said small load comprises a battery charger.

6. Electrical apparatus according to claim 1,
in which said small load comprises a lighting sensor.

7. Electrical apparatus according to claim 1,
in which said small load comprises a smoke detector.

8. Electrical apparatus according to claim 1,
in which said small load comprises a burglar alarm.

9. Electrical apparatus according to claim 1,
in which said small load comprises a passive receiver.

10. Electrical apparatus according to claim 1,
in which said small load comprises an infrared detector.

11. Electrical apparatus according to claim 1,
in which said small load comprises an ultrasonic detector.

12. Electrical apparatus according to claim 1,
in which said small load comprises communication equipment.

13. Electrical apparatus according to claim 1,
in which said small load requires an electrical voltage from 2.5 to 18 volts DC.

14. Electrical apparatus according to claim 1,
in which said small load comprises an emergency lighting device including an illuminated exit sign.

15. Electrical apparatus according to claim 14,
in which said small load also comprises a battery charger for charging a backup battery.

16. Electrical apparatus according to claim 1,
including an electromagnetic interference suppressing filter connected to said input circuit of said power supply for suppressing the transmission of interference signals between said power supply and the power line.

17. Electrical apparatus according to claim 16,
in which said input circuit comprises a pair of input terminals for connection of the power line thereto, said filter comprising a capacitor connected across said input terminals, and a pair of inductors connected between said input circuit and said respective input terminals for suppressing the transmission of interference signals.

18. Emergency lighting apparatus, comprising lamp means for which uninterrupted operation is desired;

a power supply for converting a wide ranging alternating current (AC) or direct current (DC) input voltage of a relatively high value into a regulated relatively low direct current (DC) output voltage;

said power supply comprising a power line input circuit for receiving the AC or DC input voltage;

said input circuit comprising rectifier means for rectifying the input voltage if it is AC and for transmitting the input voltage if it is DC;

filter means connected to said rectifier means for producing a filtered DC voltage;

an electronic switching circuit for producing a train of brief pulses having a variable duty cycle;

said switching circuit comprising first regulator means for varying the duty cycle of said pulses as an inverse function of the voltage from said rectifier means and said filter means so that an increase in said voltage causes a decrease in said duty cycle and vice versa;

a tandem flyback circuit connected to said filter means for receiving the filtered DC voltage therefrom;

said tandem flyback circuit comprising a first inductor and a first electronic switch connected in series across the DC voltage from said filter means;

said first electronic switch having a pair of main electrodes connected in series with said first inductor;

said first electronic switch having a control electrode connected to said switching circuit for receiving the variable duty cycle pulses therefrom whereby said electronic switch is conductive during each pulse and is non-conductive during the intervals between said pulses;

a series circuit comprising first and second diode rectifiers and a second inductor connected in series across the filtered DC voltage from said filter means;

said first and second diode rectifiers being polarized so as to be back-biased by said filtered DC voltage;

said first inductor and said first electronic switch having a first junction therebetween;

said first and second diode rectifiers having a second junction therebetween;

a first storage capacitor connected between said first and second junctions;

an output circuit comprising a third diode rectifier, a first output conductor and a second storage capacitor connected in series across said second inductor;

said first inductor being adapted to be charged with energy when said first electronic switch is conductive;

said first inductor being adapted to discharge said energy into said first storage capacitor and through said first diode rectifier when said first electronic switch is non-conductive;

said first storage capacitor being adapted to be discharged by said first electronic switch through said second inductor and said second diode rectifier when said electronic switch is conductive;

said second inductor being adapted to supply DC output current and voltage through said third diode rectifier to said output conductor and said second storage capacitor;

first means for supplying said output voltage from said output conductor to said lamp means when line voltage is supplied to said input circuit;

a battery circuit for receiving battery voltage from a storage battery for operating the lamp means when the line voltage fails;

second means for supplying said output voltage to said battery circuit for charging the battery when line voltage is supplied to said input circuit;

a second electronic switch for selectively connecting said battery circuit to said lamp means for battery operation thereof when the line voltage fails;

and third means for enabling said second electronic switch when the DC output voltage is not produced on said output conductor so that said second electronic switch connects the battery circuit to the lamp means for battery operation;

whereby the lamp means are operated by the battery when the power line voltage is not present at said power line input circuit.

19. Emergency lighting apparatus according to claim 18, in which said second means comprise diode rectifier means for conducting DC current from said output conductor to said battery circuit for charging the battery while preventing any discharging of the battery from the battery circuit to the output conductor if the DC output voltage is less than the battery voltage.

20. Emergency lighting apparatus according to claim 18, in which said third means comprise a regulated reference voltage source connected to said battery circuit and having regulating means for producing a substantially constant reference voltage;

said third means comprising a third comparator having a first input connected to said reference voltage source;

said third comparator having means for connecting said second input to said battery circuit;

said third comparator having means for enabling said second electronic switch when the battery voltage exceeds a threshold voltage established by the reference voltage, and for not enabling said second electronic switch when the battery voltage does not exceed the threshold voltage;

whereby said second electronic switch disconnects said battery circuit from said lamp means when the battery voltage no longer exceeds the threshold voltage to limit the discharging of the battery.

21. Emergency lighting apparatus according to claim 18, in which said third means comprise fourth means responsive to decreasing battery voltage for causing said second electronic switch to disconnect the battery circuit from said lamp means when the battery voltage drops below a threshold voltage due to discharging of the battery.

22. Emergency lighting apparatus according to claim 18, in which said second inductor has a secondary transformer winding coupled thereto;

a second output circuit comprising a fourth diode rectifier, a second output conductor and a third storage capacitor connected in series across said secondary winding;

said second output conductor being connected to said electronic switching circuit to provide operating power for said electronic switching circuit during normal operation;

and start-up power supply means connected between said filter means and said electronic switching circuit for supplying operating power thereto during start-up conditions.

23. Emergency lighting apparatus according to claim 18, in which said first electronic switch comprises a field effect transistor (FET).

24. Emergency lighting apparatus according to claim 18, in which said filter means comprise filter capacitor means.

25. Emergency lighting apparatus according to claim 18, in which said electronic switching means comprise second regulator means for varying the duty cycle of said brief pulses as an inverse function of the DC output voltage from said output conductor so that the duty cycle is decreased when the DC output voltage increases and vice versa.

26. Emergency lighting apparatus according to claim 18, in which said first electronic switch comprises a transistor.

* * * * *

UNITED STATES PATENT AND TRADEMARK OFFICE
CERTIFICATE OF CORRECTION

PATENT NO. : 5,847,550
DATED : December 8, 1998
INVENTOR(S) : David Schie and James A. Rekowski It is certified that error appears in the above-identified patent and that said Letters Patent is hereby corrected as shown below:

On the title page, Item [45], should read --*DEC.8, 1998--.

Column 15 in the first line of the first table, numbered line 40, "1 400v" should be: -- 400v --.

After the line which identifies the Assignee, insert the following:

-- [*] Notice. Pursuant and subject to a Terminal Disclaimer filed herein, the term of this patent shall not extend beyond the expiration of the full statutory term of Pat. No. 5,656,925, issued Aug. 12, 1997 upon application Serial No. 731,938, filed Oct. 18, 1996, of which the instant application is a division. --

Signed and Sealed this

Eleventh Day of May, 1999

Attest:

Q. TODD DICKINSON

*Attesting Officer*  *Acting Commissioner of Patents and Trademarks*